US012222226B2

(12) United States Patent
Pyrhönen et al.

(10) Patent No.: US 12,222,226 B2
(45) Date of Patent: Feb. 11, 2025

(54) VARIABLE RELUCTANCE POSITION SENSOR

(71) Applicant: LAPPEENRANNAN-LAHDEN TEKNILLINEN YLIOPISTO LUT, Lappeenranta (FI)

(72) Inventors: Juha Pyrhönen, Lappeenranta (FI); Chong Di, Lappeenranta (FI); Ilya Petrov, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 257 days.

(21) Appl. No.: 17/927,845

(22) PCT Filed: May 24, 2021

(86) PCT No.: PCT/FI2021/050373
§ 371 (c)(1),
(2) Date: Nov. 25, 2022

(87) PCT Pub. No.: WO2021/240059
PCT Pub. Date: Dec. 2, 2021

(65) Prior Publication Data
US 2023/0221148 A1 Jul. 13, 2023

(30) Foreign Application Priority Data
May 27, 2020 (FI) .................................... 20205541

(51) Int. Cl.
*G01D 5/20* (2006.01)
*G01B 7/00* (2006.01)
(52) U.S. Cl.
CPC ........... *G01D 5/2046* (2013.01); *G01B 7/003* (2013.01)

(58) Field of Classification Search
CPC .............................. G01D 5/2046; G01B 7/003
See application file for complete search history.

(56) References Cited

U.S. PATENT DOCUMENTS

2004/0070389 A1* 4/2004 Kobayashi ........... G01D 5/2046
324/207.17
2012/0262161 A1* 10/2012 Kinashi .................. H02K 24/00
324/207.25

(Continued)

FOREIGN PATENT DOCUMENTS

JP 2000-314606 11/2000
JP 2019-211331 12/2019

OTHER PUBLICATIONS

International Search Report dated Sep. 21, 2021, for PCT/FI2021/050373, 3 pp.

(Continued)

*Primary Examiner* — Eman A Alkafawi
*Assistant Examiner* — Suresh K Rajaputra
(74) *Attorney, Agent, or Firm* — NIXON & VANDERHYE

(57) ABSTRACT

A variable reluctance position sensor includes a first element having magnetic sensor sections having excitation coils, first detection coils, and second detection coils, and a second element moveable with respect to the first element. An airgap surface of the second element is periodically meandering. When an alternating signal is supplied to the excitation coils, envelopes of alternating signals induced in the first and second detection coils are dependent on a position of the second element so that the envelopes have a phase shift with respect to each other. The number of the magnetic sensor sections is $1+nP_2/P_1$, where $P_1$ is a spatial shift between successive magnetic sensor sections, $P_2$ is a spatial meandering period of the airgap surface, and n is an integer. The magnetic sensor section in addition to the $nP_2/P_1$ (Continued)

magnetic sensor sections is suitable for compensating for unwanted effects caused by ends of the first element.

20 Claims, 3 Drawing Sheets

(56) References Cited

U.S. PATENT DOCUMENTS

| | | | |
|---|---|---|---|
| 2013/0009631 A1* | 1/2013 | Tsuge | G01D 5/2046 |
| | | | 324/207.18 |
| 2013/0162243 A1 | 6/2013 | Ochiai et al. | |
| 2019/0250011 A1* | 8/2019 | Isoda | G01D 5/2448 |

OTHER PUBLICATIONS

Written Opinion of the ISA dated Sep. 21, 2021, for PCT/FI2021/050373, 4 pp.
Finnish Search Report dated Jan. 18, 2021, for FI Application No. 20205541, 2 pp.
Farid Tootoonchian et al., "Twelve-slot two-saliency variable reluctance resolver with non-overlapping signal windings and axial flux excitation", IET Electric Power Applications, vol. 11, Iss. Jan. 1, 2017, pp. 49-62.

* cited by examiner

A – A

VARIABLE RELUCTANCE POSITION SENSOR

CROSS-REFERENCE TO RELATED APPLICATION(S)

This application is the U.S. national phase of International Application No. PCT/FI2021/050373 filed May 24, 2021, which designated the U.S. and claims priority to FI 20205541 filed May 27, 2020, the entire contents of each of which are hereby incorporated by reference.

TECHNICAL FIELD

The disclosure relates to a variable reluctance position sensor that can be, for example not necessarily, a variable reluctance resolver for producing signals indicative of a rotation angle of a rotating object such as e.g. a rotor of an electric machine. For another example, the variable reluctance position sensor can be a sensor configured measure a position of a moving object such as e.g. a mover of a linear electric machine.

BACKGROUND

A variable reluctance "VR" position sensor comprises excitation coils and detection coils in a first element and no coils in a second element which is movable with respect to the first element and whose position with respect to the first element is to be measured. Thus, there is no need to conduct electric current to the moving second element. A variable reluctance position sensor can be for example a variable reluctance resolver in which the above-mentioned first element is a stator and the above-mentioned second element is a rotor whose rotation angle with respect to the stator is to be measured. A significant advantage of a variable reluctance resolver is that there is no need to conduct electric current to the rotor. A stator of a variable reluctance resolver receives an alternating excitation signal to excitation windings and produces first and second alternating output signals by first and second detection windings, respectively, wherein amplitudes of the first and second alternating output signals are dependent on the rotational position of the resolver so that envelopes of the first and second alternating output signals i.e. curves outlining extremes of the first and second alternating output signals have a mutual phase shift.

The publication US20130162243 describes a variable reluctance resolver that comprises a ring-like stator, a rotor, and a housing. The stator comprises a stator core and coils. The stator core is provided with plural salient poles. The coils are wound to the salient poles of the stator. The housing accommodates the stator. The rotor comprises an airgap surface having a profile formed with plural arc-like convex portions that deviate from a circular shape and are located at equal spaces in the circumferential direction. The number of the arc-like convex portions is the ratio of 360 degrees, i.e. a full circle, to the center angle of a measurement sector of the variable reluctance resolver. In a case where the variable reluctance resolver is used for measuring a rotational angle a rotor of an electric machine, the number of the above-mentioned arc-like convex portions can be e.g. the same as the number of pole-pairs of the electric machine, and thereby the variable reluctance resolver measures the rotational position of the rotor of the electric machine as electrical degrees. It is also possible that the number of pole-pairs of the electric machine is a multiple of the number of the arc-like convex portions. In this exemplifying case, the angle measured with the variable reluctance resolver is to be multiplied by this multiple number to obtain the rotational position of the rotor of the electric machine as electrical degrees of the electric machine.

A variable reluctance resolver of the kind described above is however not free from challenges. One of the challenges is related to cases in which a variable reluctance resolver is used for measuring a rotation angle of a rotor of an electric machine that has very many pole-pairs. In an exemplifying case where the number of the arc-like convex portions of the rotor of the variable reluctance resolver is the same as the number of pole-pairs of the electric machine, the center angle of a measurement sector of the variable reluctance resolver is small in mechanical degrees and thus the pole pitch in the stator of the variable reluctance resolver must be small in mechanical degrees to achieve a sufficient measurement accuracy in electrical degrees. This may lead to a situation in which the circumference of the stator of the variable reluctance resolver has very many stator teeth, and thereby the variable reluctance resolver is complex and expensive. In another exemplifying case where the number of pole-pairs of the electric machine is a multiple of the number of the arc-like convex portions, a sensing position error is increasing when the measured resolver angle is multiplied by this multiple number to obtain the rotational position of the rotor of the electric machine as electrical degrees of the electric machine.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In this document, the word "geometric" when used as a prefix means a geometric concept that is not necessarily a part of any physical object. The geometric concept can be for example a geometric point, a straight or curved geometric line, a planar or non-planar geometric surface, a geometric space, or any other geometric entity that is zero, one, two, or three dimensional.

In accordance with the invention, there is provided a new variable reluctance position sensor that can be for example a variable reluctance resolver for measuring a rotational angle of a rotating object. It is however also possible that a variable reluctance position sensor according to an embodiment of the invention is configured to measure a position of a linearly moving object.

A variable reluctance position sensor according to the invention comprises:
- a first element comprising a plurality of magnetic sensor sections equidistantly successively, and
- a second element moveable with respect to the first element and comprising an air-gap surface having a periodically meandering profile with at least two spatial meandering periods, wherein:
- each of the magnetic sensor sections is configured to conduct a magnetic flux to and from the second element via the airgap surface of the second element, and
- the magnetic sensor sections comprise excitation coils, first detection coils configured to produce a first alternating output signal when alternating excitation signal is supplied to the excitation coils, and second detection coils configured to produce a second alternating output signal when the alternating excitation signal is supplied to the excitation coils, amplitudes of the first and second alternating output signals being dependent on a position of the second element with respect to the first element so that envelopes of the first and second alternating output signals, i.e. curves outlining extremes of the first and second alternating output signals, have a phase-shift with respect to each other.

The number N of the magnetic sensor sections of the above-mentioned first element is:

$$N=1+n\ P_2/P_1,$$

where $P_1$ is a spatial shift between successive ones of the magnetic sensor sections, $P_2$ is the spatial meandering period of the profile of the airgap surface of the second element, $P_2/P_1$ is an integer greater than one, and n is a positive integer that is advantageously one, i.e. n=1. In principle, it suffices that the first element covers exactly one spatial meandering period of the profile of the airgap surface, i.e. there are $P_2/P_1$ magnetic sensor sections, because the functionality would be the same on other spatial meandering periods of the profile of the airgap surface, but the magnetic sensor section in addition to the $P_2/P_1$ magnetic sensor sections can be used for compensating for unwanted effects caused by the ends of the first element that comprises the plurality of the magnetic sensor sections.

In an exemplifying case where the variable reluctance position sensor is a variable reluctance resolver that is used for measuring a rotational angle of an electric machine having many pole-pairs, the stator of the variable reluctance resolver covers not 360 mechanical degrees but only n×360 electrical degrees of the electric machine, e.g. 1×360 electrical degrees or 720 electrical degrees or another multiple of 360 electrical degrees, added by the above-mentioned $P_1$ which is the spatial shift between successive ones of the magnetic sensor sections and which is n×360 electrical degrees/(N−1), the N being the number of the magnetic sensor sections in the stator of the variable reluctance resolver. The spatial shift $P_1$ can be expressed as electrical degrees as the geometry is circular.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF THE EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
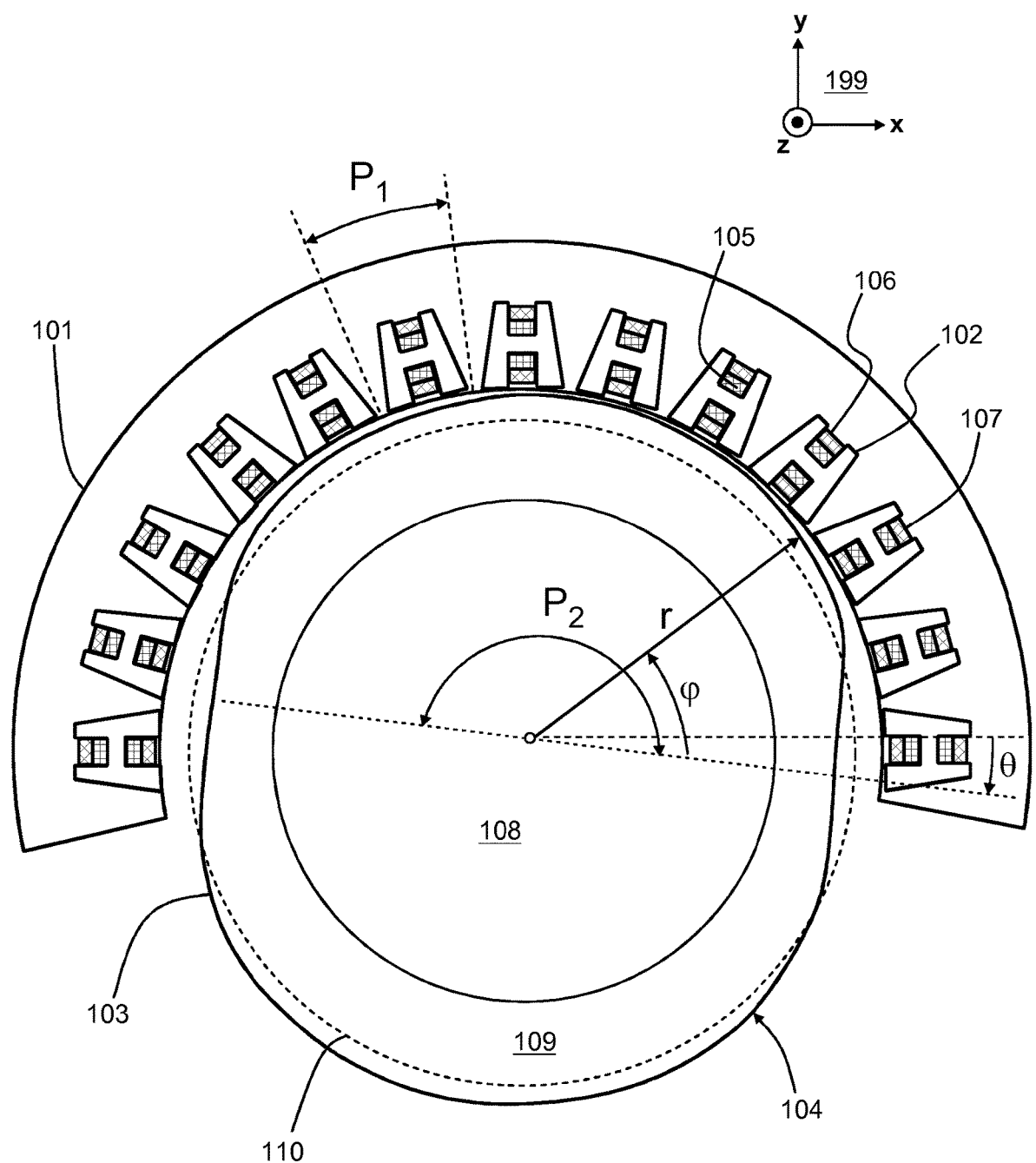
FIG. 1 illustrates a variable reluctance position sensor according to an exemplifying and non-limiting embodiment.

FIG. 1 illustrates a variable reluctance position sensor according to an exemplifying and non-limiting embodiment. The variable reluctance position sensor comprises a first element 101 and a second element 103. In this exemplifying case, the variable reluctance position sensor is a variable reluctance resolver for measuring a rotational angle θ of the second element 103 with respect to the first element 101. The first element 101, i.e. a stator, comprises a plurality of magnetic sensor sections that are equidistantly successively along an arc of a geometric circle. In FIG. 1, one of the magnetic sensor sections is denoted with a reference 102. The second element 103, i.e. a rotor, comprises an air-gap surface 104 that has a periodically meandering profile with at least two spatial meandering periods. As shown in FIG. 1, the profile of the air-gap surface 104 meanders with respect to a geometric circle 110 so that a radius r is a periodic function of a center angle φ that is defined with respect to a reference direction fixed to the second element 103. The radius r can be for example $r(\varphi)=R_0+R_1\ \sin(2\varphi+\gamma)$, where γ is a constant. A part 109 of the second element 103 may comprise electrically insulated ferromagnetic sheets stacked in the axial direction of the second element 103, i.e. in the z-direction of a coordinate system 199. It is also possible that the part 109 is made of e.g. ferrite or soft magnetic composite such as e.g. SOMALOY®. A center part 108 of the second element 103 can be made of e.g. solid steel.

Each of the magnetic sensor sections of the first element 101 is configured to conduct a magnetic flux to and from the second element 103 via the airgap surface 104 of the second element. The magnetic sensor sections comprise excitation coils. In FIG. 1, one of the excitation coils is denoted with a reference 105. The magnetic sensor sections comprise first detection coils configured to produce a first alternating output signal when alternating excitation signal is supplied to the excitation coils. In FIG. 1, one of the first detection coils is denoted with a reference 106. The magnetic sensor sections comprise second detection coils configured to produce a second alternating output signal when alternating excitation signal is supplied to the excitation coils. In FIG. 1, one of the first detection coils is denoted with a reference 107. Amplitudes of the first and second alternating output signals are dependent on the rotation angle θ of the second element 103 with respect to the first element 101 so that envelopes of the first and second alternating output signals, i.e. curves outlining extremes of the first and second alternating output signals, have a phase-shift with respect to each other.

The number N of the magnetic sensor sections of the first element 101 is:

$$N=1+n\ P_2/P_1,$$

where $P_1$ is a spatial shift between successive ones of the magnetic sensor sections, $P_2$ is the spatial meandering period of the profile of the airgap surface 104, $P_2/P_1$ is an integer greater than one, and n is a positive integer that is advantageously one. In the exemplifying variable reluctance resolver illustrated in FIG. 1, the spatial shift $P_1$ between successive ones of the magnetic sensor sections is 15 mechanical degrees, and the spatial meandering period of the profile of the airgap surface 104 is 180 mechanical degrees. The above-mentioned spatial shift $P_1$ and the spatial meandering period can be expressed as mechanical degrees since there is a circular geometry. Thus, as shown in FIG. 1, the number N of the magnetic sensor sections 13. In principle, it suffices that the first element 101 covers exactly one spatial meandering period of the profile of the airgap surface 104, i.e. there are 12 magnetic sensor sections, because the functionality would be the same on the other spatial meandering period of the profile of the airgap surface 104, but the $13^{th}$ magnetic sensor sections in addition to the 12 magnetic sensor sections can be used for compensating for unwanted effects caused by the ends of the first element 101.

In a variable reluctance position sensor according to an exemplifying and non-limiting embodiment, the number of the magnetic sensor sections of the first element is N=2M+1, where M is a positive integer and thus N is odd. The first detection coils are in the $2^{nd}$, $4^{th}$, ..., and $2M^{th}$ ones of the magnetic sensor sections, the second detection coils are in the $1^{st}$, $3^{rd}$, ..., and $2M+1^{th}$ ones of the magnetic sensor sections, and:

$$N_s(2i) = N_{s0} \sin [2\pi(2i-1)/(2M)], i=1, \ldots, M, \text{ and}$$

$$N_c(2j+1) = N_{c0} \cos [2\pi(2j)/(2M)] + N_a(2j+1), j=0, \ldots, M,$$

where $N_{s0}$ and $N_{c0}$ are predetermined integers, the absolute value of $N_s(2i)$ is the number of turns of the first detection coil in the $2i^{th}$ one of the magnetic sensor sections, the absolute value of $N_c(2j+1)$ is the number of turns of the second detection coil in the $2j+1^{th}$ one of the magnetic sensor sections, the sign of the $N_s(2i)$ is indicative of a winding direction of the first detection coil in the $2i^{th}$ one of the magnetic sensor sections, and the sign of $N_c(2j+1)$ is indicative of a winding direction of the second detection coil in the $2j+1^{th}$ one of the magnetic sensor sections. $N_a(2j+1)$ is a predetermined integer when j=0 or M, and otherwise $N_a(2j+1)$ is zero. The integers $N_a(1)$ and $N_a(2M+1)$ represent adjustments of the turn numbers of the second detections coils in $1^{st}$ and the $2M+1^{th}$ magnetic sensor sections to compensate for unwanted effects caused by the ends of the first element 101. Suitable turn number adjustments $N_a(1)$ and $N_a(2M+1)$ can be found out with e.g. simulations and/or empirical experiments. In some cases, $N_a(1)$ and/or $N_a(2M+1)$ are zeros.

The excitations coils can be for example such that:

$$N_e(k) = (-1)^{(k+1)} N_{e0}, k=1, \ldots, 2M+1,$$

where $N_{e0}$ is a predetermined integer, the absolute value of $N_e(k)$ is the number of turns of the excitation coil in the $k^{th}$ one of the magnetic sensor sections, and a sign of $N_e(k)$ is indicative of a winding direction of the excitation coil in the $k^{th}$ one of the magnetic sensor sections.

In a variable reluctance position sensor according to the above-described exemplifying and non-limiting embodiment, the envelope of the first alternating output signal produced by the first detection coils is proportional to the sine of the rotation angle θ, i.e. sin(θ), and the envelope of the second alternating output signal produced by the second detection coils is proportional to the cosine of the rotation angle θ, i.e. cos(θ).

In the exemplifying variable reluctance resolver illustrated in FIG. 1, the first detection coils are in the $2^{nd}$, $4^{th}$, ..., and $12^{th}$ ones of the magnetic sensor sections, the second detection coils are in the $1^{st}$, $3^{rd}$, ..., and $13^{th}$ ones of the magnetic sensor sections, and:

$$N_s(2i) = N_{s0} \sin [\pi(2i-1)/6], i=1, \ldots, 6, \text{ and}$$

$$N_c(2j+1) = N_{c0} \cos [\pi(2j)/6] + N_a(2j+1), j=0, \ldots, 6.$$

According to simulation results, the second detection coils i.e. a cos-signal winding would not show a balanced signal output if only 12 magnetic sensor sections that cover exactly one spatial meandering period of the profile of the airgap surface 104 were used. To be more specific, the signal amplitude varies at different time periods. The $13^{th}$ magnetic sensor section is used to compensate for this undesired phenomenon.

Figure 2A:
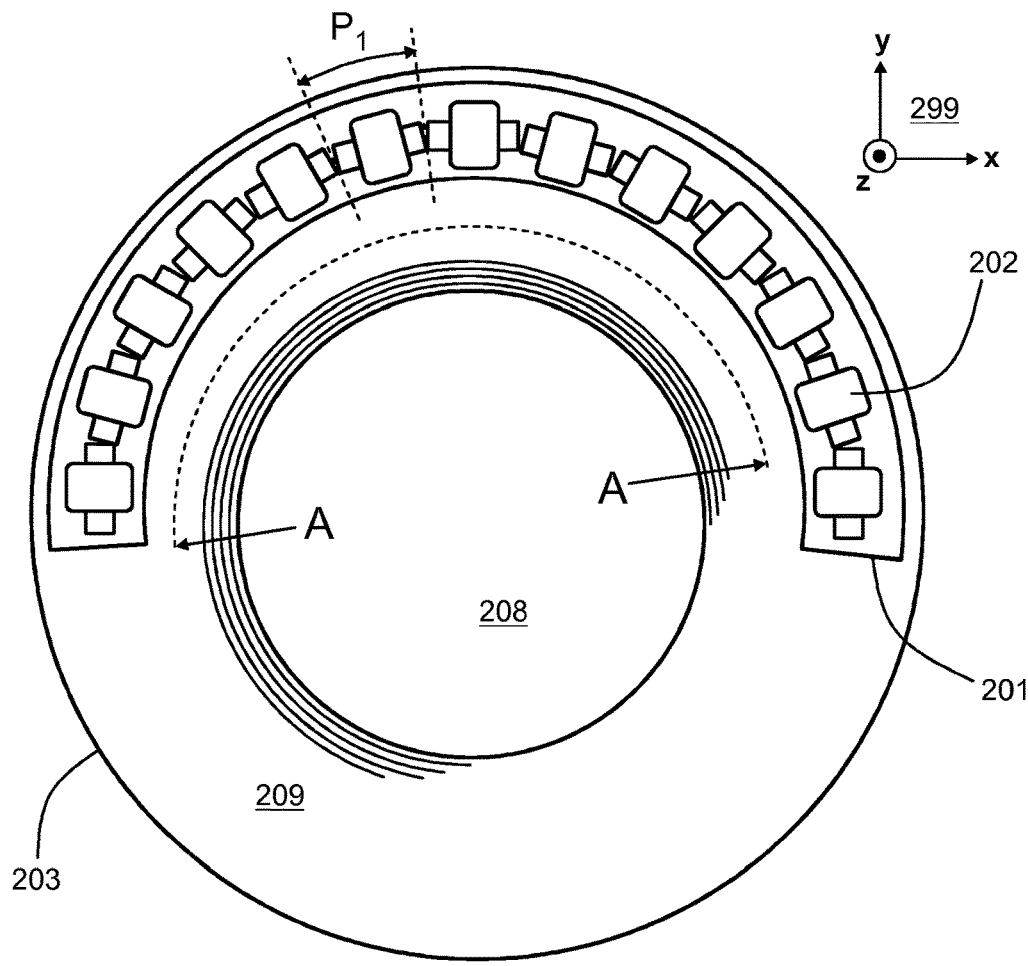
FIGS. 2a and 2b illustrate a variable reluctance position sensor according to an exemplifying and non-limiting embodiment.
Figure 2B:
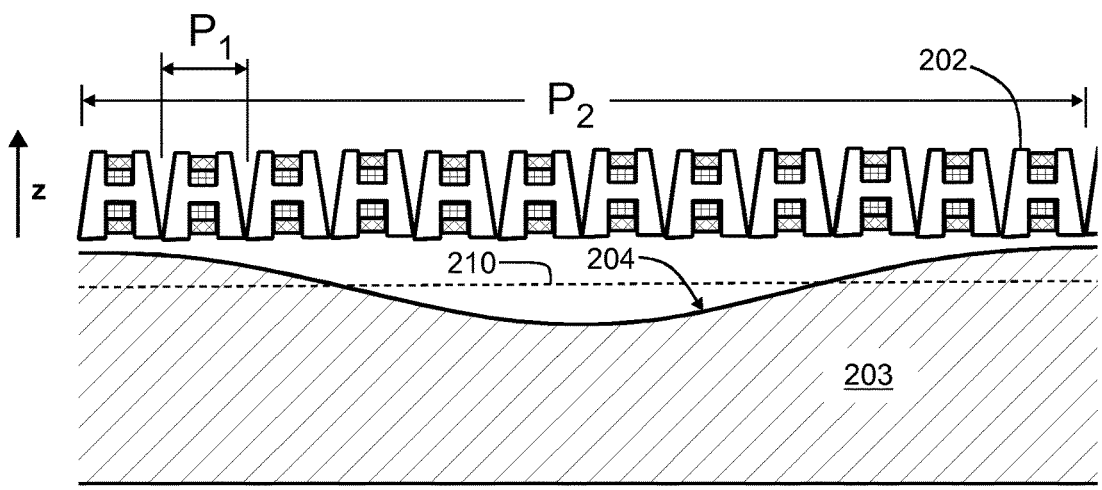

In the exemplifying variable reluctance resolver illustrated in FIG. 1, the airgap surface 104 of the second element 103, i.e. the rotor, faces radially towards the first element 101, i.e. the stator. FIGS. 2a and 2b illustrate a variable reluctance resolver according to another exemplifying and non-limiting embodiment. FIG. 2a shows the variable reluctance resolver when seen along the negative z-direction of a coordinate system 299, and FIG. 2b shows a section taken along an arc A-A shown in FIG. 2a. The variable reluctance resolver comprises a first element 201 that is a stator of the variable reluctance resolver, and a second element 203 that is a rotor of the variable reluctance resolver. The stator comprises a plurality of magnetic sensor sections that are equidistantly successively along an arc of a geometric circle. In FIGS. 2a and 2b, one of the magnetic sensor sections is denoted with a reference 202. The rotor comprises an air-gap surface 204 that has a periodically meandering profile with at least two spatial meandering periods. In this exemplifying case, the airgap surface 204 of the rotor faces axially towards the stator and the rotor and the stator are axially successive. As shown in FIG. 2b, the profile of the air-gap surface 204 meanders with respect to a geometric plane 210 that is perpendicular to the z-axis of a coordinate system 299. A part 209 of the rotor may comprise a roll of electrically insulated ferromagnetic sheet so that the geometric axis of the roll coincides with the geometric axis of rotation of the rotor. It is also possible that the part 209 is made of e.g. ferrite or soft magnetic composite such as e.g. SOMALOY®. A center part 208 of the rotor can be made of e.g. solid steel.

Figure 3A:
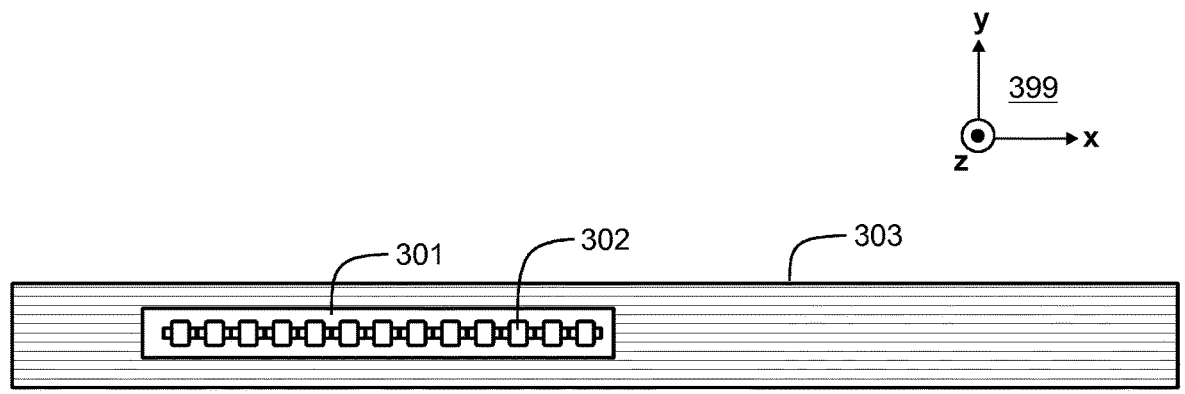
FIGS. 3a and 3b illustrate a variable reluctance position sensor according to an exemplifying and non-limiting embodiment.
Figure 3B:
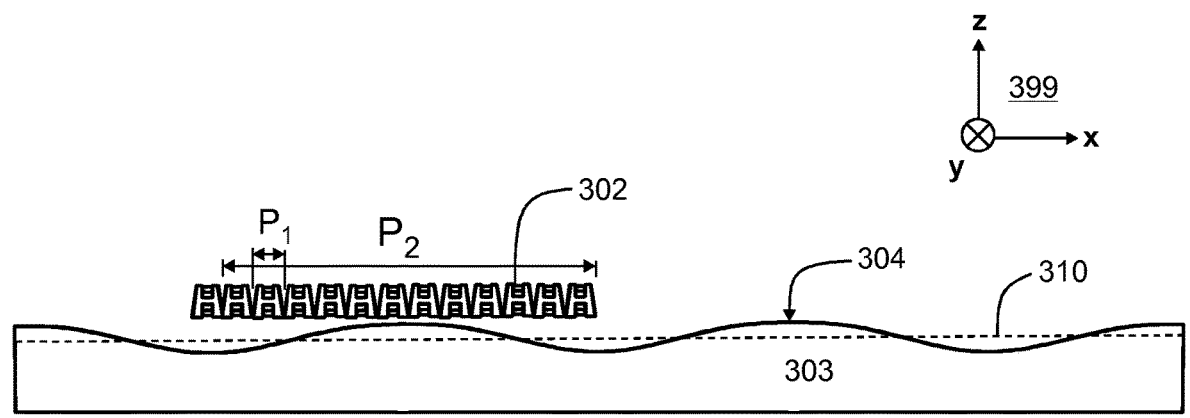

FIGS. 3a and 3b illustrate a variable reluctance position sensor according to an exemplifying and non-limiting embodiment. The variable reluctance position sensor comprises a first element 301 and a second element 303. In this exemplifying case, the variable reluctance position sensor is a linear position sensor configured measure a position of the second element 303 with respect to the first element 301 in the x-direction of a coordinate system 399. FIG. 3a shows the linear position sensor when seen along the negative z-direction of the coordinate system 399, and FIG. 3b shows the linear position sensor when seen along the positive y-direction of the coordinate system 399. The first element 301 comprises a plurality of magnetic sensor sections that are equidistantly successively along a geometric line. In FIGS. 3a and 3b, one of the magnetic sensor sections is denoted with a reference 302. The second element 303 comprises an air-gap surface 304 that has a periodically meandering profile with at least two spatial meandering periods. As shown in FIG. 3b, the profile of the air-gap surface 304 meanders with respect to a geometric plane 310 that is perpendicular to the z-axis of the coordinate system 399.

In the exemplifying variable reluctance position sensors illustrated in FIGS. 1, 2a, 2b, 3a, and 3b, each of the magnetic sensor sections has a magnetic core element separate from magnetic core elements of other ones of the magnetic sensor sections. Each magnetic core element comprises material whose relative magnetic permeability p is greater than one. The material is advantageously ferromagnetic material. Each magnetic core element may comprise e.g. a stack of electrically insulated steel sheets, ferrite, or soft magnetic composite. It is however also possible that the magnetic sensor sections have a common magnetic core that has teeth and a yoke connected to the teeth.

The specific examples provided in the description given above should not be construed as limiting the scope and/or the applicability of the appended claims. List and groups of examples provided in the description given above are not exhaustive unless otherwise explicitly stated.

What is claimed is:

1. A variable reluctance position sensor comprising:
   a first element comprising a plurality of magnetic sensor sections equidistantly successively, and
   a second element moveable with respect to the first element and comprising an air-gap surface having a periodically meandering profile with at least two spatial meandering periods,
   wherein:
   each of the magnetic sensor sections is configured to conduct a magnetic flux to and from the second element via the airgap surface of the second element, and
   the magnetic sensor sections comprise excitation coils, first detection coils configured to produce a first alternating output signal when alternating excitation signal is supplied to the excitation coils, and second detection coils configured to produce a second alternating output signal when the alternating excitation signal is supplied to the excitation coils, amplitudes of the first and second alternating output signals being dependent on a position of the second element with respect to the first element so that envelopes of the first and second alternating output signals have a phase-shift with respect to each other,
   wherein a number N of the magnetic sensor sections of the first element is:

$$N=1+n\,P_2/P_1,$$

where $P_1$ is a spatial shift between successive ones of the magnetic sensor sections, $P_2$ is the spatial meandering period of the profile of the airgap surface of the second element, $P_2/P_1$ is an integer greater than one, and n is a positive integer.

2. The variable reluctance position sensor according to claim 1, wherein the variable reluctance position sensor is a variable reluctance resolver in which the first element is a stator and the second element is a rotor that is rotatable with respect to the stator, the magnetic sensor sections being equidistantly successively along an arc of a geometric circle and the position of the second element with respect to the first element being a rotation angle of the rotor with respect to the stator.

3. The variable reluctance position sensor according to claim 2, wherein the airgap surface of the rotor faces radially towards the stator and a radius of the rotor is a periodic function of a center angle with respect to a reference direction fixed to the rotor.

4. The variable reluctance position sensor according to claim 3, wherein the rotor comprises electrically insulated ferromagnetic sheets stacked in an axial direction of the rotor.

5. The variable reluctance position sensor according to claim 2, wherein the airgap surface of the rotor faces axially towards the stator and the rotor and the stator are axially successive.

6. The variable reluctance position sensor according to claim 5, wherein the rotor comprises a roll of electrically insulated ferromagnetic sheet, a geometric axis of the roll coinciding with a geometric axis of rotation of the rotor.

7. The variable reluctance position sensor according to claim 1, wherein the variable reluctance position sensor is a linear position sensor configured measure a position of the second element with respect to the first element in a direction of a linear movement of the first element with respect to the second element.

8. The variable reluctance position sensor according to claim 1, wherein the number N of the magnetic sensor sections of the first element is an odd number.

9. The variable reluctance position sensor according to claim 8, wherein the number of the magnetic sensor sections of the first element is N=2M+1, where M is a positive integer, the first detection coils are in $2^{nd}, 4^{th}, \ldots,$ and $2M^{th}$ ones of the magnetic sensor sections, the second detection coils are in $1^{st}, 3^{rd}, \ldots,$ and $2M+1^{th}$ ones of the magnetic sensor sections, and:

$$N_s(2i)=N_{s0}\sin[2p(2i-1)/(2M)], i=1,\ldots,M, \text{ and}$$

$$N_c(2j+1)=N_{c0}\cos[2p(2j)/(2M)]+N_a(2j+1), j=0,\ldots,M,$$

where $N_{s0}$ and $N_{c0}$ are predetermined integers, an absolute value of $N_s(2i)$ is a number of turns of the first detection coil in $2i^{th}$ one of the magnetic sensor sections, an absolute value of $N_c(2j+1)$ is a number of turns of the second detection coil in $2j+1^{th}$ one of the magnetic sensor sections, a sign of the $N_s(2i)$ is indicative of a winding direction of the first detection coil in the $2i^{th}$ one of the magnetic sensor sections, a sign of $N_c(2j+1)$ is indicative of a winding direction of the second detection coil in the $2j+1^{th}$ one of the magnetic sensor sections, and $N_a(2j+1)$ is a predetermined integer when j=0 or M, and otherwise $N_a(2j+1)$ is zero.

10. The A-variable reluctance position sensor according to claim 9,
    wherein:

$$N_e(k)=(-1)^{(k+1)}N_{e0}, k=1,\ldots,2M+1,$$

where $N_{e0}$ is a predetermined integer, an absolute value of $N_e(k)$ is a number of turns of the excitation coil in $k^{th}$ one of the magnetic sensor sections, and a sign of $N_e(k)$ is indicative of a winding direction of the excitation coil in the $k^{th}$ one of the magnetic sensor sections.

11. The A-variable reluctance position sensor according to claim 1, wherein each of the magnetic sensor sections has a magnetic core element separate from magnetic core elements of other ones of the magnetic sensor sections.

12. The variable reluctance position sensor according to claim 2, wherein the number N of the magnetic sensor sections of the first element is an odd number.

13. The variable reluctance position sensor according to claim 3, wherein the number N of the magnetic sensor sections of the first element is an odd number.

14. The variable reluctance position sensor according to claim 4, wherein the number N of the magnetic sensor sections of the first element is an odd number.

15. The variable reluctance position sensor according to claim 5, wherein the number N of the magnetic sensor sections of the first element is an odd number.

16. The variable reluctance position sensor according to claim 6, wherein the number N of the magnetic sensor sections of the first element is an odd number.

17. The variable reluctance position sensor according to claim 7, wherein the number N of the magnetic sensor sections of the first element is an odd number.

18. The variable reluctance position sensor according to claim 2, wherein each of the magnetic sensor sections has a magnetic core element separate from magnetic core elements of other ones of the magnetic sensor sections.

19. The variable reluctance position sensor according to claim 3, wherein each of the magnetic sensor sections has a magnetic core element separate from magnetic core elements of other ones of the magnetic sensor sections.

20. The variable reluctance position sensor according to claim 4, wherein each of the magnetic sensor sections has a magnetic core element separate from magnetic core elements of other ones of the magnetic sensor sections.

* * * * *